(12) United States Patent
Mäkelä

(10) Patent No.: US 7,581,174 B2
(45) Date of Patent: Aug. 25, 2009

(54) DISPLAYING A WEB PAGE IN A BROWSER WINDOW AND A METHOD FOR HANDLING A WEB PAGE

(75) Inventor: Mikko Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 221 days.

(21) Appl. No.: 11/040,829

(22) Filed: Jan. 21, 2005

(65) Prior Publication Data

US 2005/0188298 A1 Aug. 25, 2005

(30) Foreign Application Priority Data

Jan. 22, 2004 (FI) .................................. 20040086

(51) Int. Cl.
*G06F 17/00* (2006.01)
(52) U.S. Cl. .................. 715/238; 715/227; 715/252
(58) Field of Classification Search ................ 715/513, 715/523, 780, 238, 249, 252, 227
See application file for complete search history.

(56) References Cited

U.S. PATENT DOCUMENTS

| | | | |
|---|---|---|---|
| 6,556,217 B1 | | 4/2003 | Makipaa et al. |
| 7,103,836 B1 * | | 9/2006 | Nakamura et al. .......... 715/526 |
| 7,362,311 B2 * | | 4/2008 | Filner et al. ................ 345/169 |
| 2002/0054126 A1 * | | 5/2002 | Gamon ....................... 345/781 |
| 2002/0091738 A1 | | 7/2002 | Rohrabaugh et al. |
| 2003/0050931 A1 | | 3/2003 | Harman et al. |
| 2004/0049737 A1 | | 3/2004 | Hunt et al. |
| 2004/0100509 A1 * | | 5/2004 | Sommerer et al. .......... 345/864 |
| 2004/0148571 A1 * | | 7/2004 | Lue ............................. 715/514 |
| 2004/0255244 A1 * | | 12/2004 | Filner et al. ................. 715/517 |
| 2006/0101162 A1 * | | 5/2006 | Ivarsy et al. .................. 710/8 |
| 2006/0259859 A1 * | | 11/2006 | Ivarsoy et al. .............. 715/520 |

OTHER PUBLICATIONS

"Row/Cell Tags" Copyright 2002, http://www.echoecho.com/htmltables03.htm.*

* cited by examiner

*Primary Examiner*—Adam M Queler
(74) *Attorney, Agent, or Firm*—Ware, Fressola, Van Der Sluys and Adolphson, LLP

(57) ABSTRACT

In the method for displaying a web page, a web page received from a server and comprising a frameset is displayed in the browser window of a terminal in such a manner that the frameset is converted into a different format. In the method, the frameset is converted into a table (T), in which case each frame (F1, F2) is converted into a corresponding cell (TD1, TD2) of the table (T). The formed table (T) is then displayed in said browser window (D2). The invention also relates to a conversion method, as well as to a converting unit and a computer software for implementing this conversion method. In addition, the invention relates to a system, as well as to a terminal (MS).

20 Claims, 4 Drawing Sheets

DISPLAYING A WEB PAGE IN A BROWSER WINDOW AND A METHOD FOR HANDLING A WEB PAGE

CROSS-REFERENCE TO RELATED APPLICATIONS

This application claims priority under 35 USC §119 to Finnish Patent Application No. 20040086 filed on Jan. 22, 2004.

BACKGROUND OF THE INVENTION

The present invention relates to displaying web pages in a browser window of a terminal and especially to displaying such web pages, which comprise a frameset for dividing the content. Thus, the invention relates to a method, a system and a terminal for implementing this. Further, the invention relates to a conversion method, a conversion unit and a computer software.

Content pages (later web pages) transferred in data networks, such as Internet pages, can be browsed to some extent with several types of portable terminals. When web pages are browsed with small portable terminals (e.g. mobile phones, PDA devices, communicators), whose display is limited in size, the web page being browsed must often be modified to fit the display. In some situations, for example, images or text can be modified into a simpler form, for example, by decreasing the type font or by displaying the image as a link to the image in question. There are also other elements on web pages, which should be handled before displaying on a display of the above-mentioned kind. One such element is a so-called frameset, which is used to divide the content displayed on a page. The frameset comprises of frames, by means of which the web page becomes clearer and easier to maintain. Loading a divided content on a browser can, in addition, take less time than loading the entire content.

A simple example of the use of frames is displayed in the following. In this example, the web page comprises a two-frame frameset:

```
<FRAMESET COLS="28%, *">
<FRAME NAME="Frame1" SRC="Content1.html">
<FRAME NAME="Frame" SRC="Content2.html" >
</FRAMESET>
```

The above-presented is a very simple example of a frameset; naturally it is possible to use other attributes for describing the frames as well. In the example, <FRAMESET> determines the ratios according to which the frames displayed on the web page divide the display. In the example, <FRAME> specifies the frame more specifically and informs where the content for the frame in question is fetched from. This type of a web page is typically arranged on the display of a computer (PC) or the like, in which case when the browser window corresponds to the size of the display, the entire content of the page is visible. It is, however, to be noted that when the user himself/herself resizes (decreases) the browser window, the content of the frames does not fit the display entirely. The same problem, but even more clearly, becomes apparent when this type of a page is displayed on a physically smaller display, such as, for example, in the above-mentioned terminals, whose browser window is small due to the limitations of the display.

In order to display a frameset on the display of a mobile terminal, some solutions have already been developed. The known web page browsers of wireless terminals can display all the frames within one browser window, in which case the user can himself/herself select which frame content is opened to the entire browser window. It is also possible to view the page in such a manner that all the frames are visible at the same time, in which case one must select which frame content one wants to browse. In addition to this, it is possible to change the size of the frame dynamically, for example by grabbing the edge of the frame and moving it. It is obvious that this type of solutions increase the amount of user inputs and, in addition, for the part of the first alternative, the depth construction of the web page disappears, in which case the amount of content provided by the page is difficult to perceive.

Correspondingly, some known web page browsers of wireless terminals (especially simple text-based browsers) display the frames as text-based links. The user can select the frame to be browsed from the corresponding link <A HREF="content1.html">Link-to-content1</A> to the frame content. Implementing this is easy, but as in the previous example, because of the increasing user inputs the solution is not necessarily very usable. In addition, the file names of the frames are typically very nondescript, in which case searching the desired content becomes difficult. When naming the content of a frame with some simple file name, the textual information provided by the file name is often worse than that of the frame itself.

FIG. 1a presents in a very simplified manner how the view to a web page P comprising frames F1, F2 can change when the web page is transferred from the actual browser window D1 to a browser window D2 smaller in size in FIG. 1a. The content C1, C2 of the frames F1, F2 does not fit in the browser window D2, in which case a part of it remains undisplayed. Browsing this type of a page with a terminal, and especially with a terminal that does not comprise a pen or mouse user interface becomes very difficult and more complicated. The situation of the example presented in FIG. 1a is fictitious; it is to be noted that in reality the display D1 proposed for displaying frames can in relation be even larger than the one presented in FIG. 1a and resemble the situation of FIG. 1b more.

SUMMARY OF THE INVENTION

The purpose of the present invention is to provide one method for displaying a web page comprising a frameset in a browser window, which typically is smaller than the supposed i.e. the actual target browser window. With the method according to the invention, the web page can be fitted into a smaller browser window in such a manner that the view can be maintained substantially the same as when displayed in a large browser window, or at least as the best possible usability-wise in relation to the size of the browser window. In addition, with the method according to the invention, the web page can be fitted from a larger browser window into a smaller browser window even though the display of the device itself would correspond to the default size of the browser window. To put it more precisely, the present method is primarily characterized in that the frameset of a web page is converted into a table, in which case each frame is converted into a table cell, in which case the formed table is displayed in said browser window.

In addition to the above, the invention relates to a conversion method for converting a frameset of a web page, which conversion method is primarily characterized in that the frameset of a web page is converted into a table, in which case each frame of the frameset is converted into corresponding table cells.

The system according to the present invention is primarily characterized in that the system comprises means for converting the frameset of a web page into a table, in which case each frame is converted correspondingly to a table cell. Further, the terminal according to the present invention is primarily characterized in that the terminal is arranged to display the frameset of a web page in table format.

The conversion unit according to the present invention is primarily characterized in that the conversion unit is arranged to convert the frameset of a web page into a table, in which case the conversion unit is arranged to convert each frame into a table cell.

The computer software according to the present invention is primarily characterized in that said computer software comprises commands for converting the frameset of a web page into a table, in which case the computer software comprises commands for converting each frame into a table cell.

The other alternative embodiments of the invention are described in the dependent claims.

The present invention can be considered to have significant advantages over the present methods. One of these advantages is the improvement of usability, which, in a known manner, has a significant effect on the users' interest in browsing web pages with the terminals used as examples.

In addition, the invention can be considered to be an easy solution for the described problem. Since several browsers have a strong support for handling tables, adding the functionality according to the invention to them does not require great measures. In addition, with the solution according to the invention, the support for frames can also be brought to such browsers, which themselves are not provided with frame support (providing that these browsers support tables).

DESCRIPTION OF THE DRAWINGS

In the following, the present invention will be described in more detail with reference to the following drawings, in which.

DETAILED DESCRIPTION OF THE INVENTION

The present invention relates to displaying web pages on a terminal. The terminal can be any device suitable for browsing web pages, but a special need for the method according to the invention exists with such wireless terminals, which have a limited size display and along with it, also a limited size browser window in comparison to such terminals with whose displays said web page is designed to be displayed. The terminal comprises at least a display for viewing a web page, means for browsing a web page, as well as means for receiving a web page. This kind of a device can be, for example, some mobile device, such as a mobile phone, a PDA device (Personal Digital Assistant) or a communicator, without being limited solely to those. In this connection it is also to be mentioned that the term browser window is used in the description and claims to describe the viewing area/view to the web page. In reality, the area of a browser window can be substantially the same as the display of the terminal in question, but in some connections the browser window can be even smaller than the display of the terminal in question.

Figure 1A:
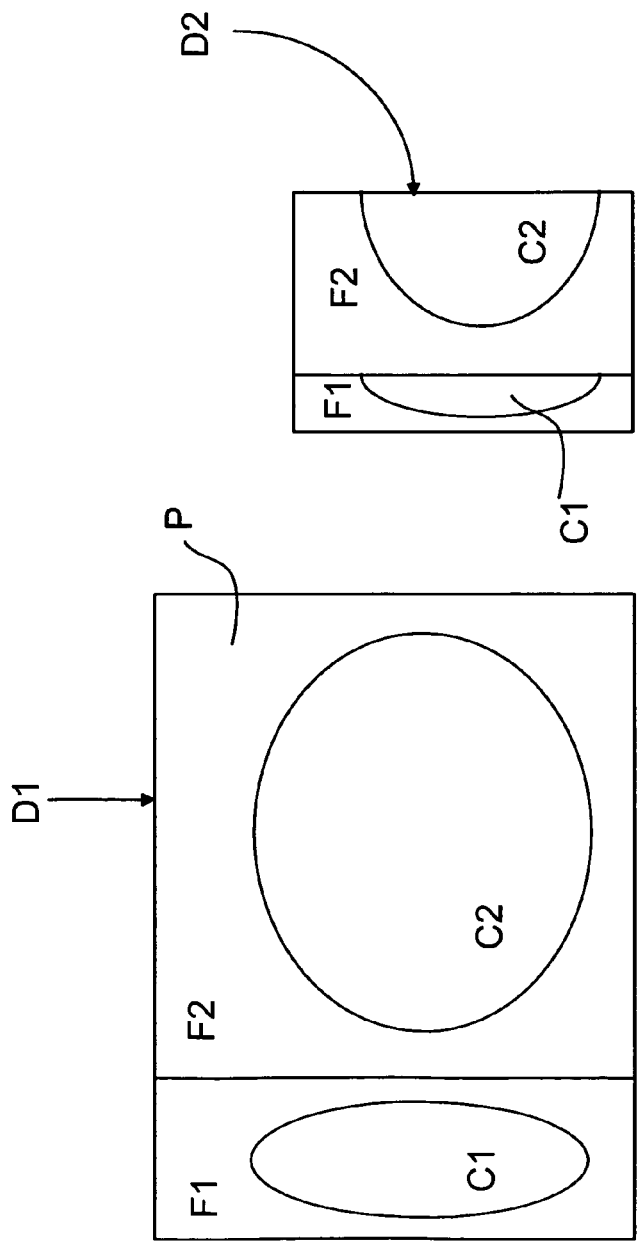
FIG. 1a presents in a very simplified manner how the web page view can change when transferred to a smaller display, FIG. 1b visualizes the possible relation of two display sizes to each other.
Figure 1B:
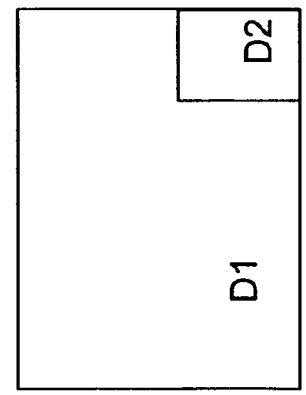
Figure 2:
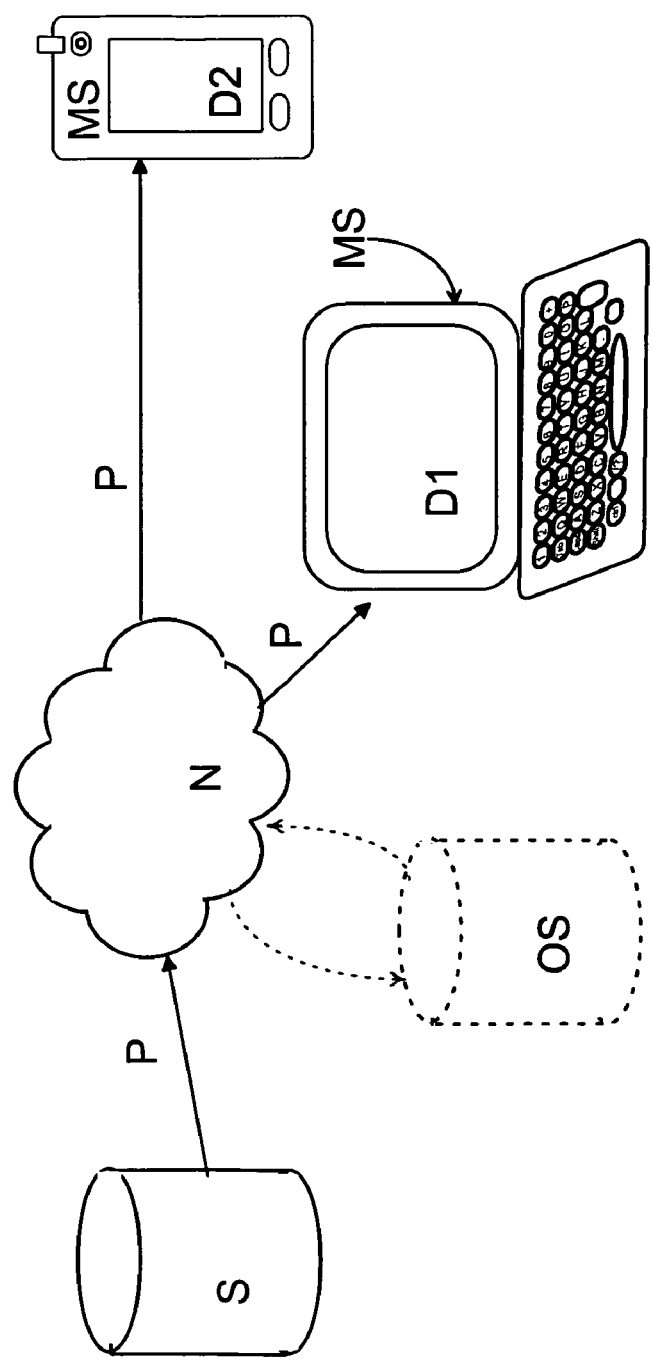
FIG. 2 presents an example of transferring a web page from a server to a terminal.

The web page being browsed is composed with some markup language, which is known as such. As examples of markup languages can be mentioned HTML (Hyper Text Markup Language) and XHTML (extensible Hyper Text Markup Language). FIG. 2 presents an example of transferring a web page P to a terminal MS. The web page is located on a server S, where it can be fetched from. The terminal MS contacts said server S via a data network N, from which server the web page P is transferred to the terminal MS. The data network N can be any known network connection. As examples can be mentioned wireless networks, such as mobile phone networks and short-range wireless networks, as well as cable networks.

The web page P may comprise a frameset for displaying the content. The frameset specification can be, for example, as follows, but it is to be remembered that the frameset specification depends on the markup language being used, in which case the form can differ significantly from this example:

```
<frameset cols="*,20%, 10%,40%" >
    <frame name="F1" src="content1.html">
    <frame name="F2" src="content2.html" >
    <frame name="F3" src="content3.html" >
    <frame name="F4" src="content4.html" >
</frameset>
```

In order to display the web page according to the present invention, the frameset is translated into a table by converting the frames into table cells. Since, for example, in the known wireless terminals table handling is more sophisticated than frame handling, displaying frames formed like this on a small display and/or in a small browser window is more usable than previously. Because of this, those separate procedures that were previously used are not needed for selecting a frame or modifying the size.

Converting the frameset into a table can be implemented, for example, in the following manner:
1) The <FRAMESET> element is handled as a table, in which case it is checked from the <FRAME> elements inside it whether they are row frames (rows) or column frames (cols).
2) If <FRAMSET> uses a row attribute, the <FRAME> elements are handled as table cells on their own rows; if the <FRAMESET> uses a column attribute, the <FRAME> elements are handled as table cells on the same row (i.e. as adjacent).

If there are <FRAMESET> elements within each other, they are correspondingly handled as nested tables. It is obvious that the above-described conversion method is only one example of the possible conversion methods and its purpose is to clarify the central idea of the invention.

The content of files (above, for example, content1.html, content2.html, etc.), where the frames are specified, can be copied as such and attached to the specification of table cells. In other words, the markup language portion specifying the frame files is copied and attached to the table file inside the cell specification. From the point of view of performance, a better conversion manner can, however, be such where there is no additional copying phase. Thus, in the table specification, the content file of a frame can be specified as the file source of each cell. With the conversion, the table can, for example, be as follows:

```
<table>
    <row>
        <cell ><file src="content1.html">
        <cell >< file src ="content2.html">
        <cell >< file src ="content3.html">
        <cell >< file src ="content4.html">
```

It is to be noted that the above-presented example is not suitable HTML markup language, in which case with the example in question it becomes clear that the converted page does not necessarily have to be in some known standardized markup language. It is important that the browser being used understands the version used by the converted page.

The latter implementation form of specifying the frames within the cells can also be applied in such a manner that the entire frame conversion is not performed entirely on the markup language level. Thus, the page is displayed as it is loading, and the loaded frame sources are converted directly in their correct positions.

The frames are converted in such a manner that substantially their entire content becomes visible. If there are scroll bars in the frames in the source file of a web page, they are not, however, displayed in table format. The borders between frames are converted into the corresponding borders of table cells. The tables formed of the frames are displayed after this in the browser window of the terminal in the manner how table handling has been taken care of in the terminal in question. It is obvious that the form of the table depends on the markup language being used. The widths/heights set for the frames of the frameset are converted correspondingly to the widths/heights of the table cells. This means that the width/height values separately set for the frames are retained in the table conversion, and the table layout algorithm then handles them in a suitable manner, e.g. uses them as the minimum values for the cell sizes or leaves these specifications entirely unnoticed. The widths and heights of the table cells can also be calculated, for example, with an "automatic table layout" algorithm known as such (CSS2 specification of W3C) or with some other known method.

Figure 4B:
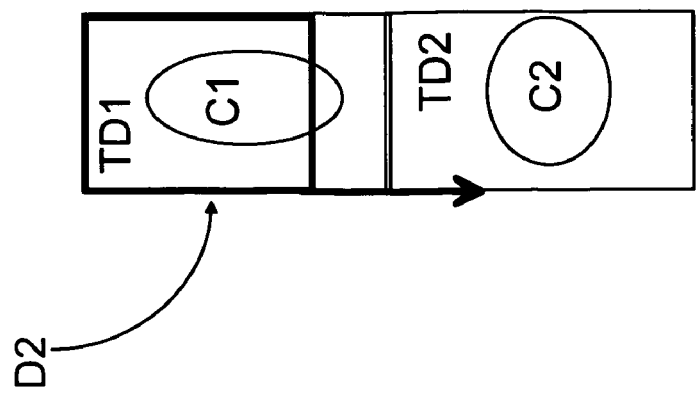
Figure 4A:
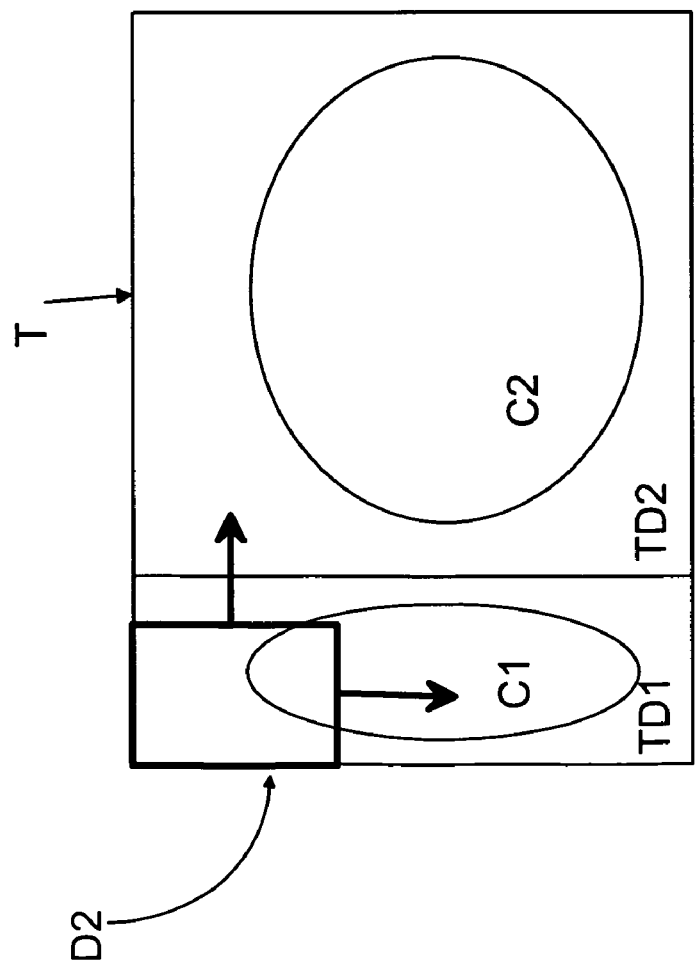

FIG. 4a presents one example, by means of which the table handling can be implemented in a terminal. In this example the table T, which comprises cells TD1, TD2, is retained substantially in its original size as it would be displayed in a default size browser window. The browser window D2 of the terminal is then moved freely over the table T, in which case those table elements that are within the view in question can be selected and handled.

FIG. 4b presents another example of table handling. In this example the terminal is arranged to optimize the table T it displays. Optimization means that the most suitable possible displaying manner is selected for the table, in which case the content of the web page is retained substantially the same size as the original, but if necessary, it is divided into rows again in such a manner that it fits the width of the browser window. For example, in table handling this means that the cells of the size of the browser window D2 of the terminal on a table row are displayed one below the other in the browser window D2 of the terminal, if they do not fit to be displayed next to each other in their original size. This can be checked by deducting from the width of the browser window D2 the size of the one or more cells TD1 already on the row, in which case the remaining area is compared to the next cell TD2. If the area corresponds substantially to the size of the second cell TD2, the second cell TD2 is fitted next to the preceding cell TD1 already on the row, but if the area is significantly smaller than the size of the second cell TD2, the second cell TD2 is divided into the next row.

To put it in a simplified manner, if the next cell is larger than the space remaining in the lateral direction on the display after one or more cells, the next cell is fitted onto the next row. The space remaining on a row after one or more cells is filled by enlarging the cell(s) in question to the width of the browser window D2. It is also possible to create a filler cell in the end of the row, which corresponds to the last cell of the row by its background colour and also possibly by its other characteristics. If the cells are in the lateral direction larger than the browser window D2 of the terminal, the content of the cells is forced or limited to the width of the display. Even though limiting the size may lead to diminution of the content, by doing this, however, the horizontal scrolling of the page can be avoided. Because of this, forcing wider elements into the width of the display can, in some situations, in practice be considered a better solution than such that would cause horizontal scrolling.

Optimization often creates a long cell chain suitable for the window width. With reference to FIG. 4b, the table cells TD1, TD2 are in the lateral direction larger than the browser window D2 of the terminal. Thus, in this example, both are modified in such a manner that they fit (by their width) into the browser window D2 of the terminal. It is obvious that one purpose of the invention is to provide an as exact as possible correspondence between the frameset and the table. Thus, it is also obvious that the cells on the same row are aimed to be optimized onto the same row and the cells on different rows are retained on different rows.

The original locations of the frames can also be presented in table cells if the user has selected viewing the page in its original form. In other words, the user can select whether the page is optimized to fit a small display or whether it is displayed in its original form (which is thus typically wider than the display in the case of portable terminals). If the user has selected that the page is displayed in its original form, the conversion of the frames into table format and displaying the table is to be implemented in such a manner that the locations of the cells formed of the frames in relation to each other are the same as the locations of the frames in relation to each other would be if the page were viewed, for example, on PC browsers.

Figure 3:
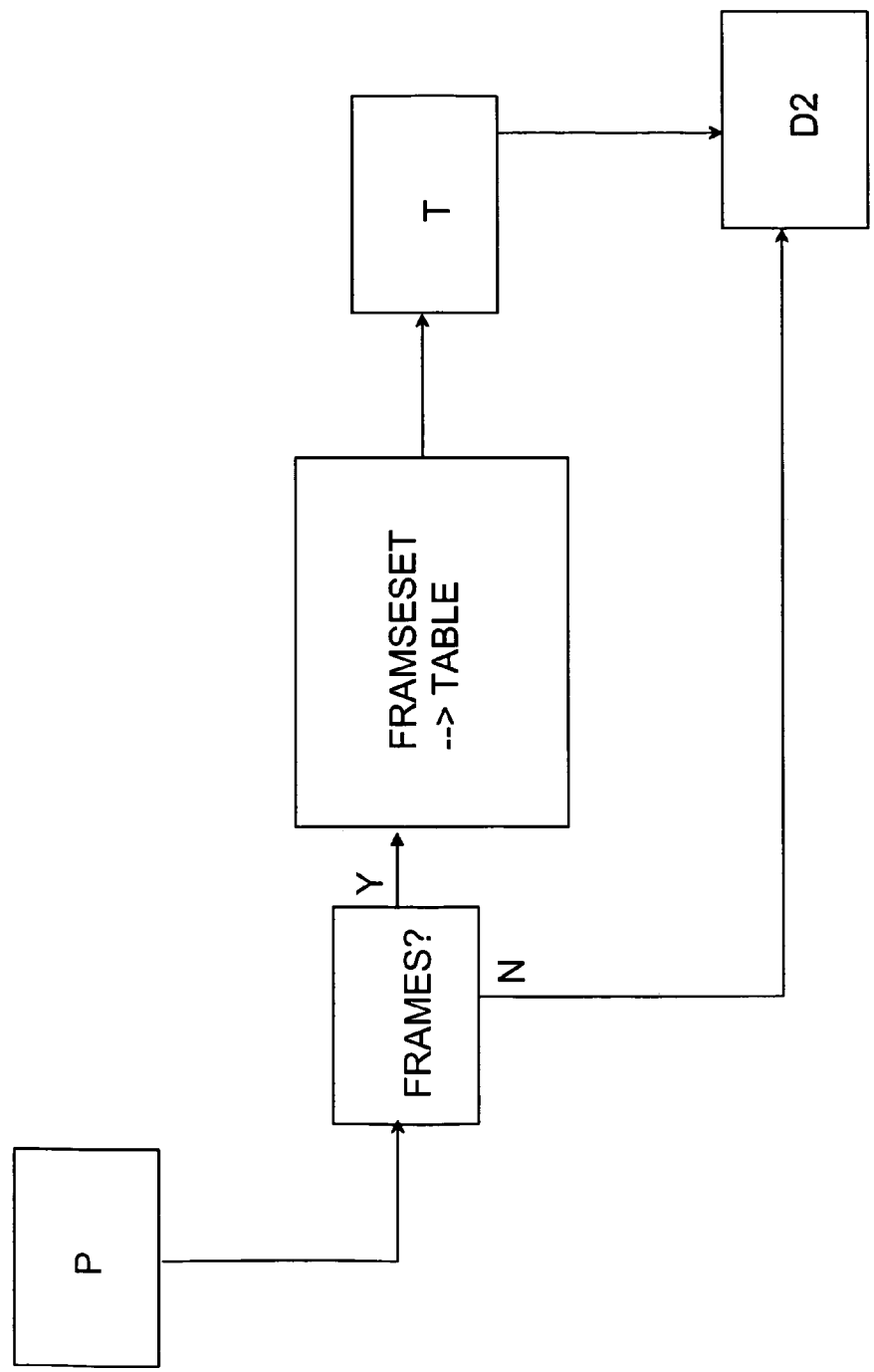
FIG. 3 presents an example of handling a web page according to the present invention, and FIGS. 4a to b visualize an example of handling a table in a terminal.

Let us further look at FIG. 3, where one example of the conversion according to the invention is presented. First, the handling of the web page P is started and it is checked whether it comprises frames (FRAMES). If this is the case (arrow Y), the frameset is converted (FRAMESET→TABLE) into a table T. This table T is then presented in the browser window D2. In the example of FIG. 3, it is to be noted that the described conversion process can take place either in the terminal MS or in the conversion server OS. If the conversion takes place in the conversion server OS, the formed table T is transferred from the conversion server OS to the terminal MS via a data network N, after which the web page can be displayed on the browser window D2.

As mentioned, the conversion according to the invention can be implemented in a server S, in a conversion server OS, or in a terminal MS. In order to implement the method, it is possible to arrange a special conversion unit, which is fitted to the terminal MS, the server S, or the conversion server OS, for example, as a computer software stored on a computer readable medium for execution by a processor. The conversion server OS, which performs the necessary conversion procedures, does not necessarily have to be provided with a browser program. Correspondingly, the server S which functions as a source of the web page, does not necessarily have to be provided with a browser program either. In other words, the conversion server OS and the server S do not necessarily have to understand anything about the converted/stored page, because the display device (terminal MS) is in the end responsible for displaying the page. The conversion server OS can be located in the network N between the source server S and the terminal MS. In addition, it is obvious that those browsers that take part in implementing the method according to the invention must be provided with support for table handling.

The above-presented primarily relates to applying the invention in documents in markup language. Here it is, however, to be pointed out that the invention can also be implemented in other connections. The method according to the invention is useful, for example, in converting different programs designed for a large display and/or browser window for a small display. As an example of this kind of a program can be mentioned a Java language application, which has been made for a large display and which uses a frameset in its user interface. If this application is desired to be run in a device with a small display, that frameset can be converted into a table set according to the invention.

These described examples may prove that the method according to the invention can be applied in several different connections. Thus, it is obvious that by combining what was mentioned above, it is possible to further create different embodiments that comply with the spirit of the invention. Because of this, the above described is not to be interpreted as limiting the invention, but the central idea of the invention about converting a frameset into a table must be kept in mind. Thus, the embodiments of the invention may freely vary within the scope of the inventive features described in the claims.

What is claimed is:

1. A method for displaying a web page in a browser window, comprising:
    converting the web page containing a frameset comprising a plurality of frames to suit the browser window in question, wherein said converting the webpage comprises converting the frameset of the web page into a table, and converting each frame into at least one cell of the table,
    optimizing the table to fit the width of the browser window by:
    configuring two or more cells for display on the same row, wherein the two or more cells fit on the same row;
    deducting the size of the two or more cells in the same row of the table from the width of the browser window to determine the size remaining;
    determining a next cell of the same row does not fit in the size remaining; and
    configuring the at least one next cell of the same row for display on a next row; and
    displaying the table in said browser window.

2. The method according to claim 1, wherein the area of said browser window is smaller than the area of said web page.

3. The method according to claim 1, wherein cells on different rows are displayed in the browser window correspondingly on their own rows.

4. The method according to claim 1, wherein the browser window is moved over the table in order to browse a plurality of different areas of the table.

5. The method according to claim 1, further comprising converting at least one border of the frameset into at least one border of the table.

6. The method according to claim 1, wherein the widths/heights set for the frames of the frameset are converted correspondingly into widths/heights of the cells of the table.

7. The method according to claim 1, wherein the frameset of the web page is converted into a table in a terminal comprising the browser window.

8. The method according to claim 1, wherein the frameset of the web page is converted into the table in a conversion server, and wherein the table is transferred to a terminal comprising the browser window.

9. A system for displaying a web page, comprising:
    a terminal comprising a browser window,
    a storage device configured to store at least the web page,
    wherein the storage device is configured to connect to a data transfer connection with the terminal in order to transfer the web page,
    wherein said web page comprises at least a frameset comprising a plurality of frames for dividing the content,
    wherein the system further comprises a conversion unit configured to convert the frameset of the web page into a table, wherein each frame is converted into at least one cell of the table, and said conversion unit is configured to optimize the table to fit the width of the browser window by:
    configuring two or more cells for display on the same row, wherein the two or more cells fit on the same row;
    deducting the size of the two or more cells in the same row of the table from the width of the browser window to determine the size remaining,
    determining a next cell of the same row does not fit in the size remaining; and
    configuring the at least one next cell of the same row for display on a next row.

10. The system according to claim 9, wherein the conversion unit is located in one of the following: said storage device, said terminal, or a conversion server.

11. A terminal for browsing a web page, comprising:
    a receiver configured to receive a web page comprising at least a frameset comprising a plurality of frames for dividing content via a data transfer connection,
    a conversion unit configured to convert the frameset of the webpage into a table by converting each frame of the frameset into at least one cell of the table,
    an optimizer configured to optimize the table to fit the width of a browser window by:
    configuring two or more cells for display on the same row, wherein the two or more cells fit on the same row;
    deducting the size of the two or more cells in the same row of the table from the width of the browser window to determine the size remaining,
    determining a next cell of the same row does not fit in the size remaining; and
    configuring the at least one next cell of the same row for display on a next row, and
    the browser window is configured to display the table.

12. The terminal according to claim 11, wherein the terminal further comprises a user interface device for moving the display over the table in order to browse different areas of the table.

13. The terminal according to claim 11, wherein the terminal also comprises a communicator for performing mobile communication.

14. A terminal for browsing a web page, comprising:
means configured to receive a web page comprising at least a frameset comprising a plurality of frames for dividing content over a data transfer connection,
means configured to convert the frameset of the webpage into a table by converting each frame of the frameset into at least one cell of the table,
means configured to optimize the table to fit the width of a browser window by:
configuring two or more cells for display on the same row, wherein the two or more cells fit on the same row;
deducting the size of the two or more cells in the same row of the table from the width of the browser window to determine the size remaining,
determining a next cell of the same row does not fit in the size remaining; and
configuring the at least one next cell of the same row for display on a next row, and
means configured to display the table.

15. A converting unit for converting a web page, which said web page comprises at least a frameset comprising a plurality of frames for dividing the content, wherein the converting unit comprises executable commands stored on a readable medium for execution by a processor so as to convert the frameset of the web page into a table, in which case executable commands convert each frame into at least one cell of the table, and optimize the table to fit the width of a browser window by configuring two or more cells for display on the same row, wherein the two or more cells fit on the same row; deducting the size of the two or more cells in the same row of the table from the width of the browser window to determine the size remaining, determining a next cell of the same row does not fit in the size remaining; and
configuring the at least one next cell of the same row for display on a next row.

16. The converting unit according to claim 15, wherein the converting unit is located in one of the following: a converting server, a mobile communication device, or a source server configured to store a web page.

17. A computer software product for converting a web page, which said web page comprises at least a frameset comprising a plurality of frames for dividing the content, wherein said computer software product comprises computer executable commands stored on a readable medium for execution by a processor, wherein the computer executable commands are for converting the frameset of the web page into a table, in which case the computer software comprises commands to convert each frame into at least one cell of the table, and optimize the table to fit the width of a browser window by configuring two or more cells for display on the same row, wherein the two or more cell fit on the same row; deducting the size of the two or more cells in the same row of the table from the width of the browser window to determine the size remaining, determining a next cell for the same row does not fit in the size remaining; and
configuring the at least one next cell of the same row for display on a next row.

18. The computer software product according to claim 17, wherein the computer software product is stored in one of the following devices: a terminal, a converting server, or source server configured to store a web page.

19. A computer software product for displaying a web page on a browser window, which said web page comprises at least a frameset comprising a plurality of frames for dividing the content, wherein said computer software product comprises computer executable commands stored on a readable medium for execution by a processor, wherein the computer executable commands are for
converting the frameset of the webpage into a table by converting each frame of the frameset into at least one cell of the table,
optimizing the table to fit the width of the browser window by configuring two or more cells for display on the same row, wherein the two or more cells fit on the same row; deducting the size of the two or more cells in the same row of the table from the width of the browser window to determine the size remaining, determining a next cell of the same row does not fit in the size remaining; and
configuring the at least one next cell of the same row for display on a next row, and
displaying the frameset of the web page in table format.

20. The computer software product according to claim 19, wherein the computer software product is stored in a terminal.

* * * * *

UNITED STATES PATENT AND TRADEMARK OFFICE
CERTIFICATE OF CORRECTION

PATENT NO.       : 7,581,174 B2
APPLICATION NO. : 11/040829
DATED            : August 25, 2009
INVENTOR(S)      : Mikko Mäkelä

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Fourteenth Day of September, 2010

David J. Kappos
*Director of the United States Patent and Trademark Office*